US009360372B2

(12) United States Patent
Hale

(10) Patent No.: US 9,360,372 B2
(45) Date of Patent: Jun. 7, 2016

(54) SYSTEM AND METHOD FOR USING A PORTABLE NEAR IR LED LIGHT SOURCE AND PHOTOGRAMMETRY FOR BORESIGHT HARMONIZATION OF AIRCRAFT AND GROUND VEHICLE COMPONENTS

(75) Inventor: Michael W. Hale, Ft. Worth, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 281 days.

(21) Appl. No.: 13/818,500

(22) PCT Filed: Jun. 13, 2012

(86) PCT No.: PCT/US2012/042119
§ 371 (c)(1),
(2), (4) Date: Feb. 22, 2013

(87) PCT Pub. No.: WO2012/177449
PCT Pub. Date: Dec. 27, 2012

(65) Prior Publication Data
US 2013/0153768 A1    Jun. 20, 2013

Related U.S. Application Data

(60) Provisional application No. 61/498,705, filed on Jun. 20, 2011.

(30) Foreign Application Priority Data

Jun. 12, 2012 (IN) .......................... 2321/CHE/2012

(51) Int. Cl.
*G01J 5/02*       (2006.01)
*G01C 11/02*   (2006.01)

(52) U.S. Cl.
CPC .. *G01J 5/02* (2013.01); *G01C 11/02* (2013.01)

(58) Field of Classification Search
CPC .......................................................... G01J 5/02
USPC .............................................. 250/338.1, 342
See application file for complete search history.

(56) References Cited

U.S. PATENT DOCUMENTS 5,007,736 A * 4/1991 Daniel ...................... F41G 3/22
                                                            244/3.16
5,047,638 A     9/1991 Cameron et al.
(Continued)

OTHER PUBLICATIONS

PCT/US2012/042119 International Search Report mailed Sep. 24, 2012.

*Primary Examiner* — David Porta
*Assistant Examiner* — Faye Boosalis
(74) *Attorney, Agent, or Firm* — Daniel J. Long; Global IP Services, PLLC; Prakash Nama

(57) ABSTRACT

Disclosed is a system and method for using a portable near (infrared light emitting diode) IR LED light source and photogrammetry for boresight harmonization of aircraft and ground vehicle components. In one embodiment, orientation and positional parameters of two or more fixed points and distances between the two or more fixed points are measured using the portable near IR LED light source with a photogrammetric system. The two or more fixed points are reference points within the aircraft or the land vehicle. Further, the measured orientation and positional parameters of the two or more fixed points and the distances between the two or more fixed points on the aircraft or the land vehicle are compared with specified design parameters of the component in the aircraft or the land vehicle. Furthermore, the component in the aircraft or the land vehicle is harmonized based on an outcome of the comparison.

14 Claims, 7 Drawing Sheets

(56) References Cited

U.S. PATENT DOCUMENTS

| | | |
|---|---|---|
| 6,072,572 A | 6/2000 | Hatfield et al. |
| 6,307,623 B1 | 10/2001 | Papuchon et al. |
| 2002/0100884 A1* | 8/2002 | Maddock ................. 250/559.29 |
| 2003/0193664 A1 | 10/2003 | Hamar et al. |
| 2004/0219056 A1* | 11/2004 | Tribelsky ................ B65B 55/08 422/22 |
| 2007/0046448 A1 | 3/2007 | Smitherman |

* cited by examiner

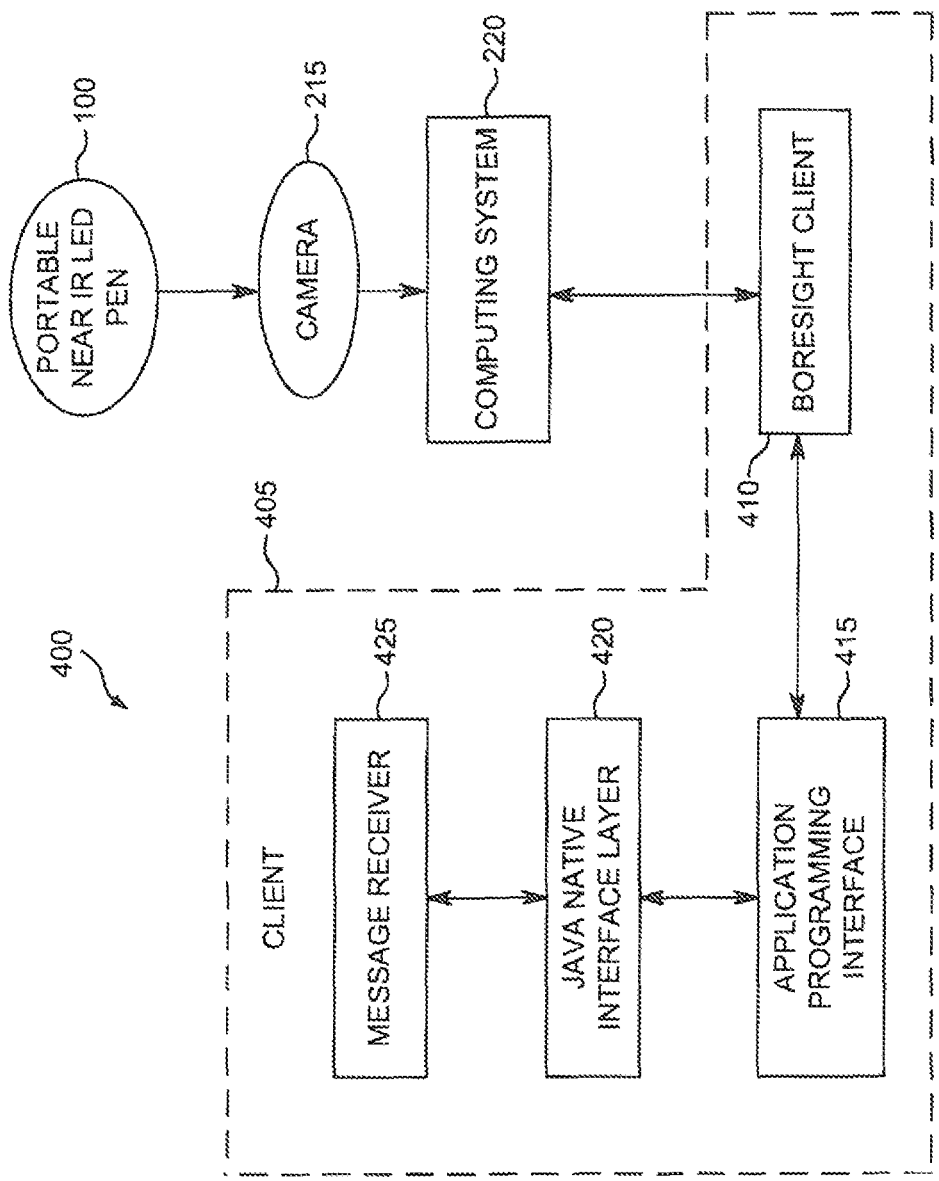

SYSTEM AND METHOD FOR USING A PORTABLE NEAR IR LED LIGHT SOURCE AND PHOTOGRAMMETRY FOR BORESIGHT HARMONIZATION OF AIRCRAFT AND GROUND VEHICLE COMPONENTS

CROSS-REFERENCE TO RELATED APPLICATIONS

This Application claims rights under 35 USC §119(e) from U.S. application Ser. No. 61/498,705 filed Jun. 20, 2011 the contents of which are incorporated herein by reference.

BACKGROUND OF THE INVENTION

1. Field of the Invention

The present invention relates to sighting systems, and more particularly, to boresight harmonization and alignment systems.

2. Brief Description of Related Art

Typically, boresight alignment or harmonization of the mounting provisions of an air vehicle system or a component thereof requires removing the equipment. Upon completing the harmonization, the equipment is re-installed and the system undergoes a functional check. The harmonization is done with multiple adapters with varying degrees of complexity and expends valuable time and resources in addition to air vehicle down time. The boresight adapters themselves require alignment and calibration, typically involving jigs and elaborate calibration setups.

One existing method uses lasers to measure boresight alignment by aiming lasers to a target board having markings attached to a certain location on an aircraft and these techniques are crude and not accurate for determining x, y and z positions. Another existing technique uses gyros for boresight alignment. However, this method provides the roll, pitch and yaw and does not provide the x, y and z coordinate positions.

There may be certain disadvantages to the traditional boresight alignment systems. These possible disadvantages may include unstable weapon system targeting accuracy, high acquisition and life cycle costs, high failure rate, regular maintenance or calibration may be required, lack of built-in-test (hard to determine cause of failure and corrective action), and a large logistic footprint. Current systems may also require a high level of skill and constant training to use. A minimum of two and normally three to five operators are needed and platform systems must often be removed prior to any checks.

SUMMARY OF THE INVENTION

Disclosed is a system and method for using a portable near (infrared light emitting diode) IR LED light source and photogrammetry for boresight harmonization of aircraft and ground vehicle components. In one embodiment, the method includes measuring orientation and positional parameters of two or more fixed points and distances between the two or more fixed points using the portable near IR LED light source with a photogrammetric system. The two or more fixed points are reference points within the aircraft or the land vehicle. Measuring the orientation and the positional parameters of the two or more fixed points on the aircraft or the land vehicle includes measuring roll, pitch and yaw of the two or more fixed points on the aircraft or the land vehicle. Measuring the distances between the two or more fixed points includes measuring x, y and z direction distances between the two or more fixed points on the aircraft or the land vehicle. The orientation and positional parameters and the distances are measured with respect to one, two or three axis.

The measured orientation and positional parameters of the two or more fixed points and the distances between the two or more fixed points on the aircraft or the land vehicle are compared with specified design parameters of the component in the aircraft or the land vehicle. The specified design parameters of the component in the aircraft or the land vehicle are predetermined and stored in a database of a computing system. Based on the comparison of an outcome, the component in the aircraft is harmonized.

According to one embodiment, the portable near IR LED light source is a portable near IR LED pen or a probe having two or more light emitting diodes (LEDs). According to another embodiment, the portable near IR LED pen includes eight LEDs.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which;

FIG. 4 illustrates a block diagram of a client/server software component connectivity with the system shown in FIG. 2, according to an embodiment of the present subject matter and;

DETAILED DESCRIPTION OF THE INVENTION

The exemplary embodiments described herein in detail for illustrative purposes are subject to many variations in structure and design.

The terms, "boresight alignment", "boresight harmonization" and harmonization are used interchangeably throughout the document.

Boresight alignment or Boresight harmonization may be required for harmonizing one or more components in an aircraft or a land vehicle according to reference points in the aircraft or the land vehicle. The reference points are fixed points in the aircraft or the land vehicle. In the present invention, the harmonization of components in the aircraft or the land vehicle are achieved by using a portable near infrared light emitting diode (IR LED) light source with a photogrammetric system. The portable near IR LED light source is a portable near IR LED pen or a probe. The photogrammetric system includes a camera coupled to a computing system. The photogrammetric system follows the technique of photogrammetry which analyzes geometric properties of objects obtained from photographic images.

In the present invention, orientation and positional parameters of two or more fixed points and distances between the two or more fixed points are measured using the portable near IR LED light source with the photogrammetric system. The measured orientation and positional parameters of the two or more fixed points and the distances between the two fixed points on the aircraft or land vehicle are compared with specified design parameters of the component in the aircraft or the land vehicle. The specified design parameters of the component in the aircraft or the land vehicle are predetermined and stored in a database of the computing system. Based on the comparison of an outcome, the component in the aircraft or the land vehicle is harmonized.

Figure 1A:
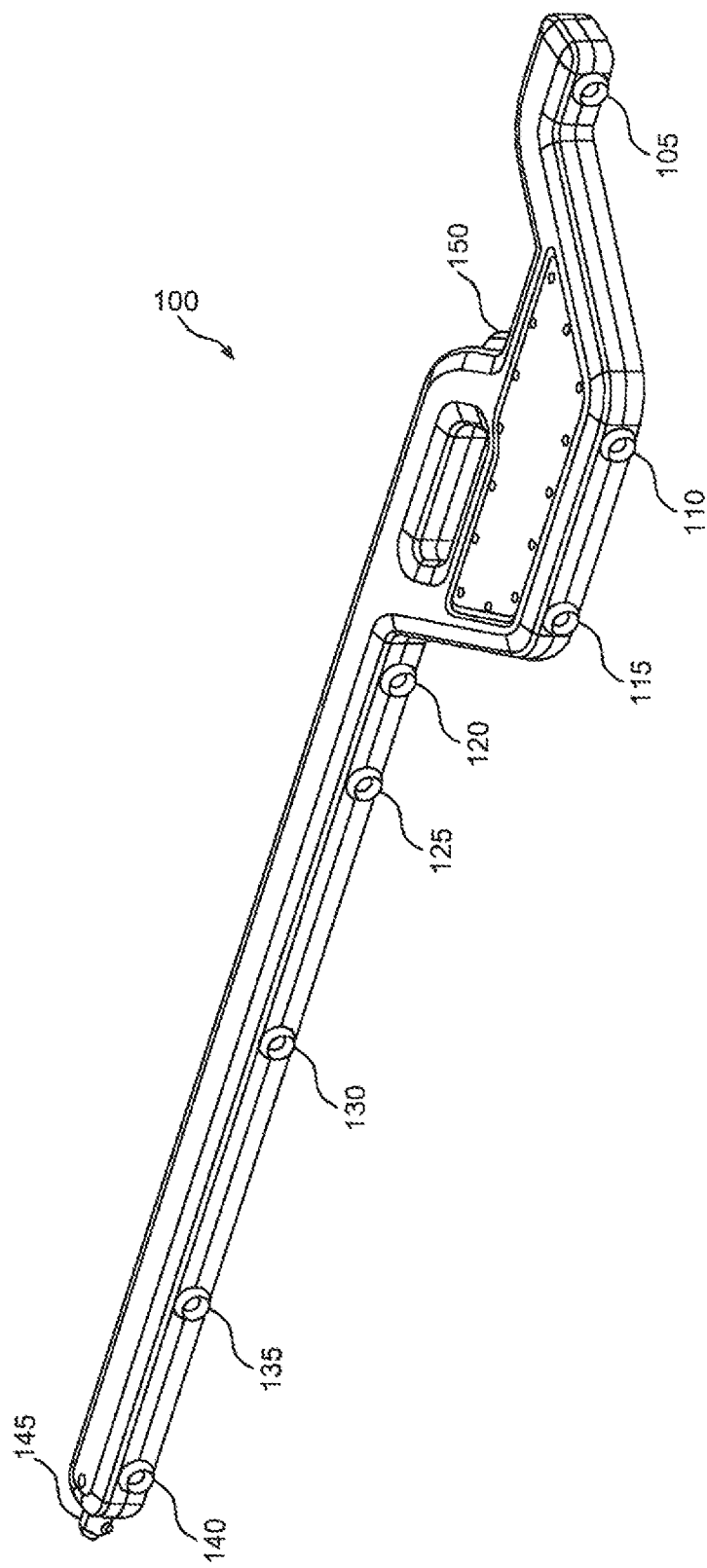
FIGS. 1A and 1B illustrate different views of a portable near IR LED pen used in performing boresight harmonization, according to an embodiment of the present subject matter.
Figure 1B:
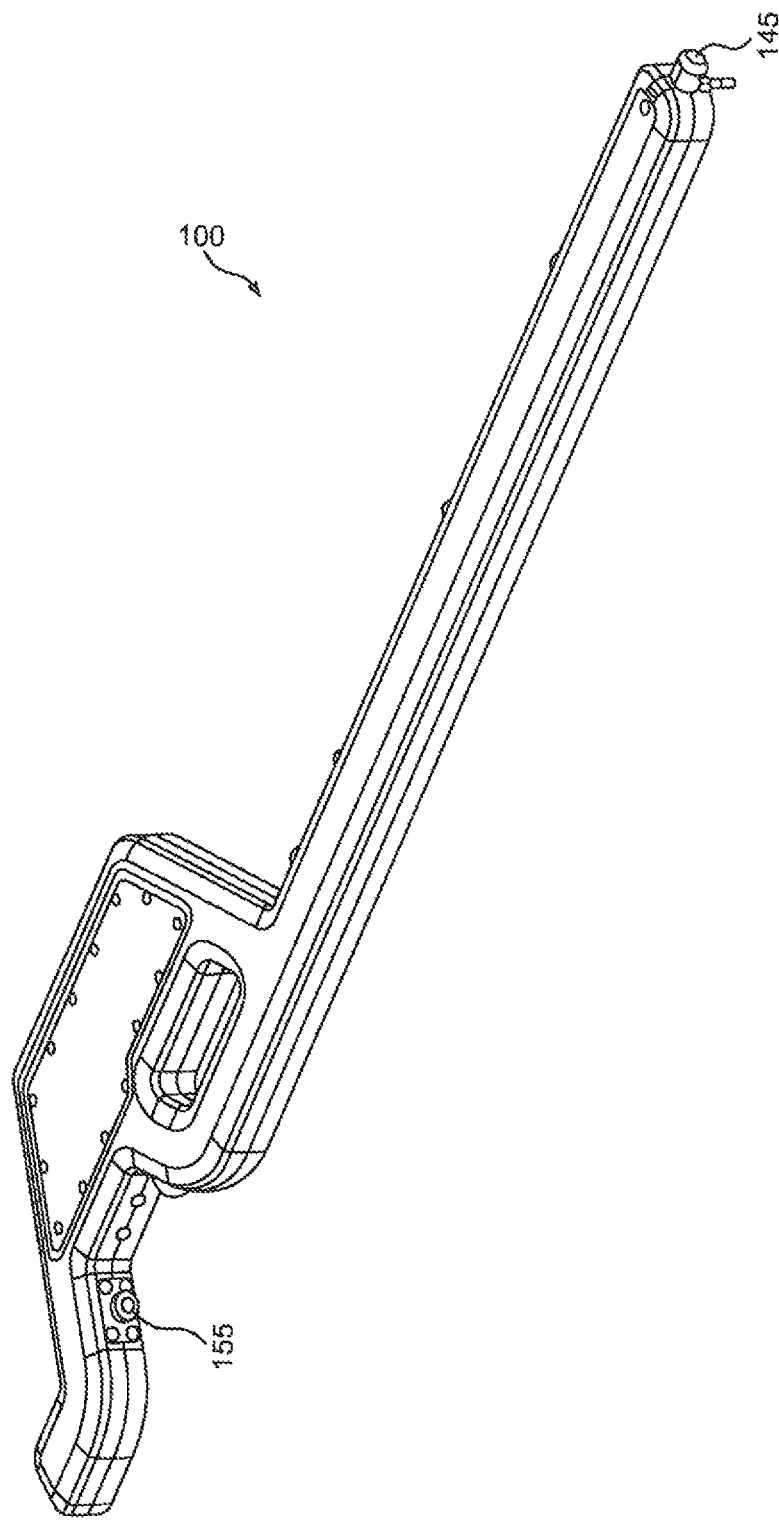

FIGS. 1A and 1B illustrate different views of a portable near IR LED pen 100 used in performing boresight harmonization, according to an embodiment of the present subject matter. As shown in FIG. 1A, the portable near IR LED pen 100 includes but not limited to 8 LEDs denoted by 105, 110, 115, 120, 125, 130, 135 and 140. However, in some embodiments, the portable near IR LED pen 100 includes at least two LEDs. Further, as shown in FIGS. 1A and 1B, the portable near IR LED pen 100 includes a chuck assembly 145, a switch 150, and a connector 155. In operation, the chuck assembly 145 is placed on a component of an aircraft for initializing boresight harmonization. Further, the portable near IR LED pen 100 is triggered using the switch 150 upon placing it on the component of the aircraft. Alternatively, the portable near IR LED pen 100 is triggered upon receiving an instruction from a computing system of a photogrammetric system (not shown in FIGS. 1A and 1B).

Figure 2:
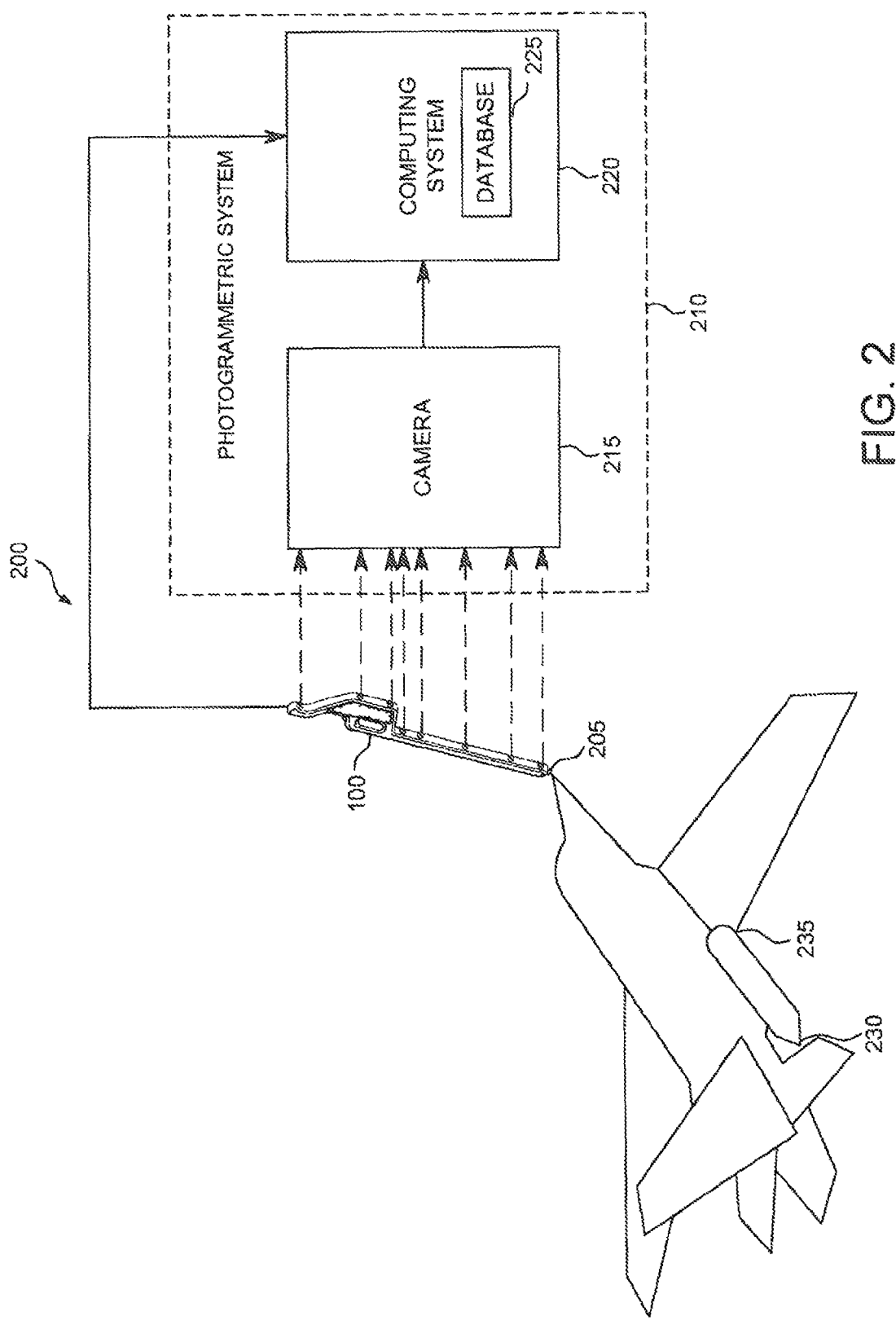
FIG. 2 is a block diagram of a system for harmonizing mounting provisions of a component in an aircraft or a land vehicle, according to an embodiment of the present subject matter.

Furthermore, the portable near IR LED pen 100 is coupled to the camera (not shown in FIGS. 1A and 1B) residing in the photogrammetric system. The portable near IR LED pen 100 is coupled to the camera using a cable connected to the connector 155, FIG. 2 is a block diagram of a system 200 for harmonizing mounting provisions of a component 205 in an aircraft or a land vehicle, according to an embodiment of the present subject matter. The system 200 includes the potable near IR LED light source such as the portable near IR LED pen 100, a photogrammetric system 210 having a camera 215 coupled to a computing system 220. The computing system 220 further includes a database 225. The system 200 also shows the component 205 which is a portion of the aircraft for which the boresight harmonization has to be performed. Furthermore, the portable near IR LED pen 100 is communicatively coupled to the photogrammetric system 210.

In operation, the portable near IR LED pen 100 is placed on the component 205 of the aircraft for which the boresight harmonization has to be performed. On triggering the portable near IR LED pen 100, the camera 215 derives the orientation and positional parameters of the two or more fixed points 230,235 and the distance between the two or more fixed points 230, 235 by observing the LEDs located on the portable near IR LED pen 100. The orientation and positional parameters includes but not limited to roll, pitch and yaw of the two or more fixed points on the aircraft. The distances between the two or more fixed points on the aircraft are x, y and/or z directions between the two or more fixed points on the aircraft. The two or more fixed points 230 and 235 are reference points with respect to the component 205. The reference points are residing within the aircraft.

Furthermore, the orientation and positional parameters are sent to the computing system 220 residing in the photogrammetric system 210. The photogrammetric system 210 compares the measured orientation and positional parameters and the distance of the two fixed points 230 and 235 on the aircraft or the land vehicle with specified design parameters of the component 205. The specified designed parameters are stored in the database 2.25 of the computing system 220. The photogrammetric system 210 harmonizes the component 205 of the aircraft based on an outcome of the comparison.

According to one embodiment, the portable near IR light source such as the portable near IR LED pen 100 along with the photogrammetric system 210 used to measure the orientation and positional parameters of two or more fixed points 230, 235 and distances between the two or more fixed points 230, 235 is configured to derive positional data of the two or more fixed points 230, 235 by observing the two or more LEDs located on the portable near IR LED pen 100 by the camera 215, to compute the orientation and positional parameters of the two or more LEDs relative to a camera global coordinate system by inputting the derived positional data received from the camera 215 and to measure the orientation and positional parameters of the two or more fixed points 230, 235 and the distances between the two or more fixed points 230, 235 and transforming the computed orientation and positional parameters.

According to yet another embodiment, a coordinate system is used to compute the orientation and positional parameters obtained from the portable near IR LED pen 100. The coordinate systems of the aircraft, the land vehicle, the camera 215 and the portable near IR pen 100 are different from one another. Therefore, for achieving harmonization, the measurements taken by the portable near IR pen 100 are transformed into the camera coordinate system, and then transformed into the aircraft coordinate system.

According to yet another embodiment, calculations required for achieving harmonization such as transformations to measure roll, pitch, yaw, x, y, and/or z axis in aircraft are performed at the computing system 220. Even the calculations for shimming, potting, or loading measurement into the aircraft are automatic and do not require a maintainer to make additional calculations.

According to yet another embodiment, the portable near IR LED light source such as the portable near IR LED pen 100 along with the photogrammetric system 210 is configured to measure the orientation and positional parameters such as roll, pitch and yaw of the two or more fixed points 230, 235 on the aircraft or the land vehicle.

According to yet another embodiment, the portable near IR LED light source such as the portable near IR LED pen 100 along with the photogrammetric system 210 is configured to measure x, y and z direction distances between the two or more fixed points 230,235 on the aircraft or the land vehicle.

Consider a scenario where the portable near IR pen 100 is triggered by a set of instructions received on the computing system 220. A first instruction is to measure point A on the component 205 of the aircraft. On placing the portable near IR pen 100 at point A, the orientation parameters roll, pitch and yaw are measured at point A. The measured orientation parameters are compared to the specified design parameters stored in the database 225 of the computing system 220.

A second instruction is to measure point B on the aircraft. Point B is a reference point 230 within the aircraft. The orientation parameters are measured at point B and are compared to the specified design parameters. The distance between point A and point B may also be measured. The orientation parameters are measured between point A and point B and are compared with the specified design parameters stored in the database 225 of the computing system 220.

A third instruction is to measure point C. Point C is a reference point 235 within the aircraft. The orientation parameters for point C are measured and compared with the specified design parameters. The distance between point B and C is also measured. The orientation parameters are determined for the distance between point B and C and are compared to the specified design parameters stored in the database 225 of the computing system 220.

Based on the outcome of the comparison, the component 205 of the aircraft is harmonized.

Figure 3A:
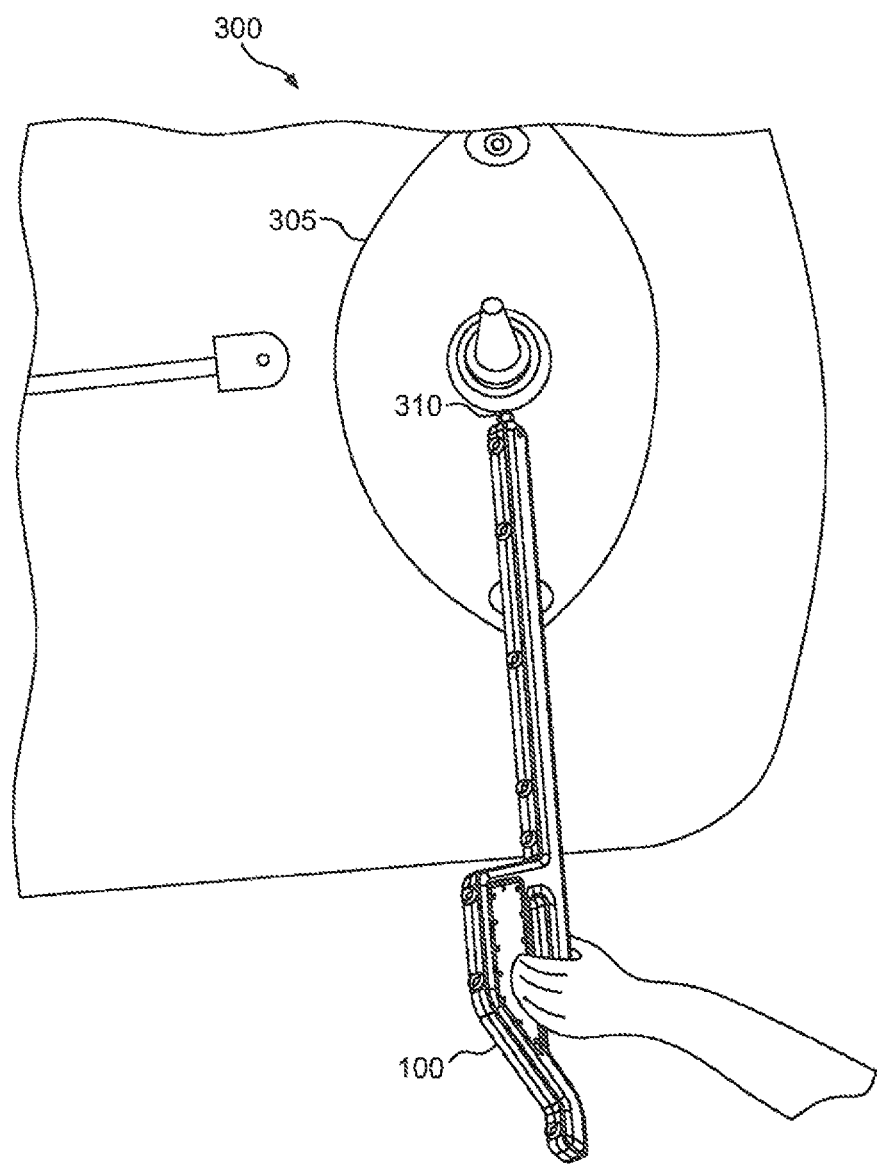
FIGS. 3A and 3B illustrate use and positioning of the portable near IR LED pen, such as those shown in FIG. 2, on various aircraft components for boresight harmonization, according to an embodiment of the present subject matter.
Figure 3B:
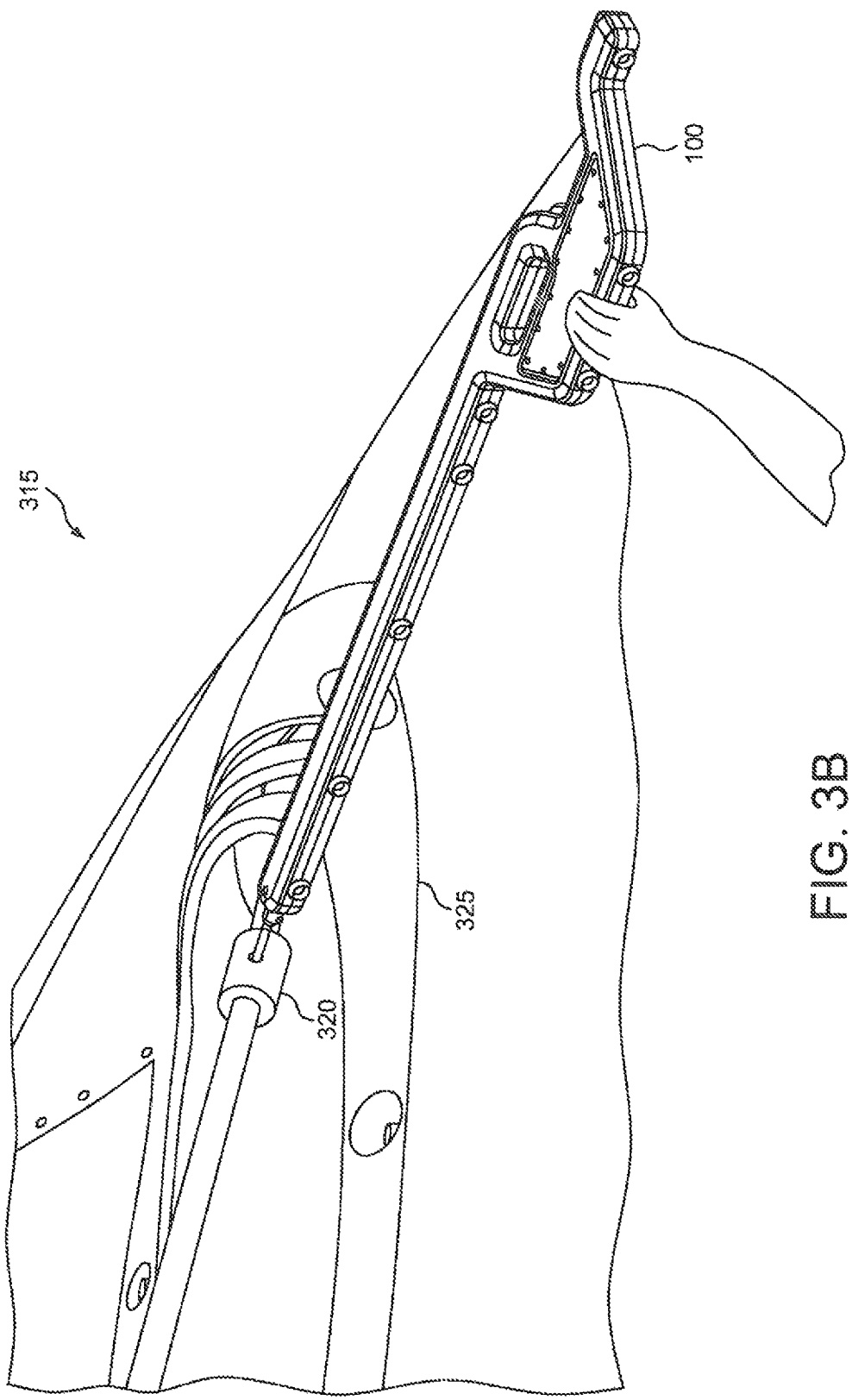

FIGS. 3A and 3B illustrate use and positioning of the portable near IR LED pen 100, such as those shown in FIG. 2, on aircraft components for boresight harmonization, according to an embodiment of the present subject matter. At 300 of FIG. 3A, a portion of the aircraft 305 and a component 310 of the aircraft are shown. The portable near IR LED pen 100 is placed on the component 310 for which boresight harmonization has to be performed.

Similarly, at 315 of FIG. 3B, a portion of the aircraft 325 and a component 320 of the aircraft are shown. The portable near JR. LED pen 100 is placed at a component 320 for which boresight harmonization has to be performed. The boresight harmonization is performed as described in FIG. 2.

FIG. 4 illustrates a block diagram of client/server software component 400 connectivity with the system shown in FIG. 2, according to an embodiment of the present subject matter The client software component 400 includes the portable near IR LED pen 100, the camera 215, the computing system 220 and a client 405. The client 405 further includes a boresight client 410, an application programming interface (AN) 415, a Java Native Interface (JNI) layer 420 and a message receiver 425. The computing system 220 may be a Metronor server. The API 415 may be a Metronor API. The portable near IR LED pen 100 is placed on a component of the aircraft or the land vehicle. The camera 215 observes LEDs present in the portable near IR LED pen 100 to derive orientation and positional parameters of two or more fixed points and the distance between the two or more fixed points. The derived orientation and positional parameters of two or more fixed points and the distance between the two or more fixed points are sent to the computing system 220. The computing system 220 communicates with the client 405 through the boresight client 410 by using the API 415. The JNI layer 420 allows the communication between the computing system 220 and the client 405. According to one embodiment, the boresight client 410 requests message from the computing system 220 using appropriate device drivers and sends it to the message receiver 425. The message may include the derived orientation and positional parameters of two or more fixed points and the distance between the two or more fixed points. The communication between the boresight client 410 and the message receiver 425 is established by the JNI layer 420.

Figure 5:
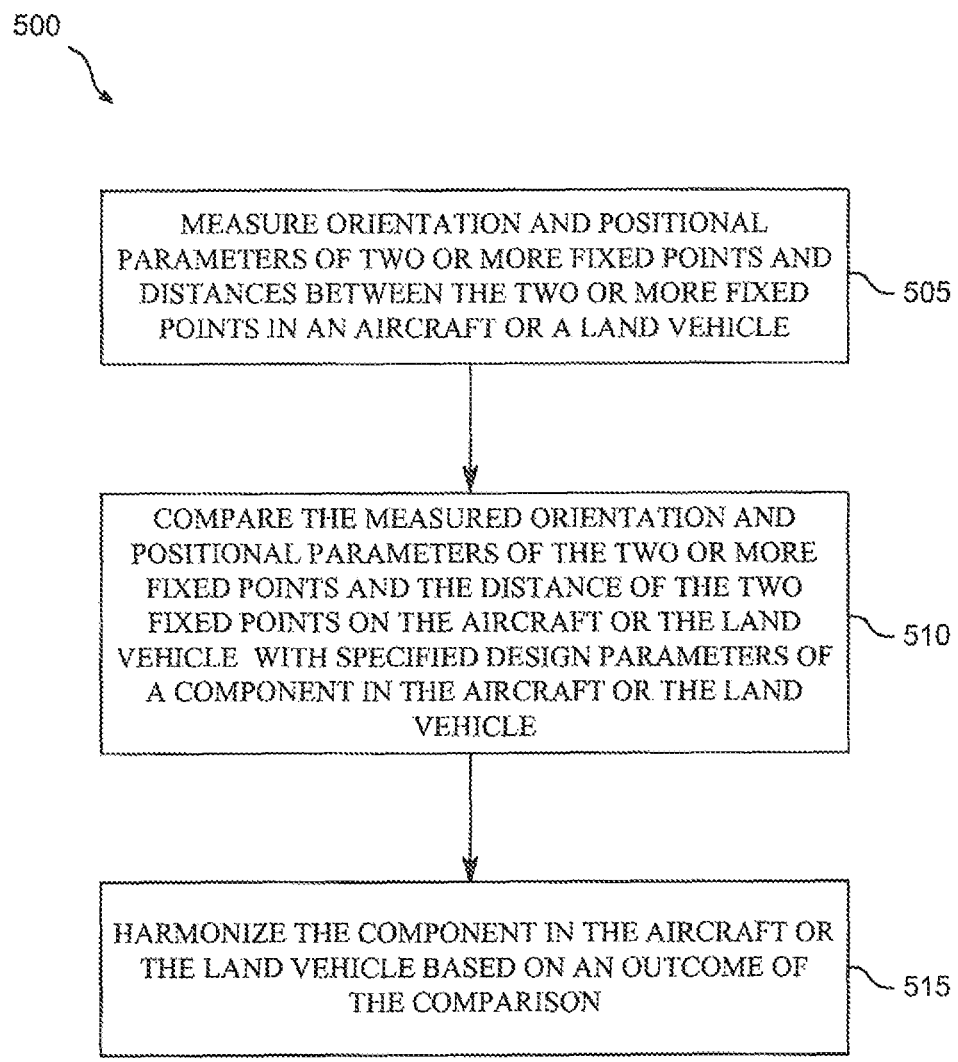
FIG. 5 illustrates a flowchart of a method for harmonizing mounting provisions of the component in the aircraft or the land vehicle, according to an embodiment of the present subject matter.

FIG. 5 illustrates flowchart 500 of a method for harmonizing mounting provisions of a component in an aircraft or a land vehicle, according to an embodiment of the present subject matter. At process block 505, orientation and positional parameters of two or more fixed points and distances between the two or more fixed points in the aircraft or the land vehicle are measured. The orientation and positional parameters of two or more fixed points and distances between the two or more fixed points in the aircraft or the land vehicle are measured by using the portable near IR LED light source along with the photogrammetric system. The two or more fixed points are reference points within the air craft or the land vehicle. The portable near IR LED light source is the portable near IR LED pen or the probe having two or more LEDs. The orientation and positional parameters of the two or more fixed points on the aircraft or the land vehicle includes but not limited to roll, pitch and yaw of the two or more fixed points on the aircraft or the land vehicle. The distances measured between the two or more fixed points on the aircraft or the land vehicle may include x, y and z direction distances between the two or more fixed points on the aircraft or the land vehicle.

According to one embodiment, measuring the orientation and positional parameters of the two or more fixed points and the distances between the two or more fixed points using the portable near IR LED with the photogrammetric system includes deriving positional data of the two or more fixed points by observing the two or more LEDs located on the portable near IR LED light source by the camera. The orientation and positional parameters of the two or more LEDs relative to a camera global coordinate system is computed by inputting the derived positional data received from the camera. The orientation and positional parameters of the two or more fixed points and distances between the two or more fixed points are computed by transforming the computed orientation and positional parameters.

According to another embodiment, the orientation and positional parameters of the two or more fixed points and the distances between the two or more fixed points are measured with respect to one, two or three axis. The one, two or three axis are x, y and z axis,. According to yet another embodiment, measuring the orientation and positional parameters of the two or more fixed points and the distance between the two or more fixed points are based on continuous measurements or one-time measurements.

At process block 510, the measured orientation and positional parameters of the two or more fixed points and the distance of the two fixed points on the aircraft or the land vehicle are compared with specified design parameters of the component in the aircraft or the land vehicle. The specified design parameters are stored in the database of the computing system. At process block 515, the component in the aircraft or the land vehicle is harmonized based on an outcome of the comparison.

According to yet another embodiment, harmonizing the component of the aircraft or the land vehicle includes automatically obtaining mathematical geometrical results, manually performing any air or vehicle component mount adjustments, automatically selecting shimming sizes used for vehicle potted component mounts, and/or loading the measured orientation parameters and distance measurements into the aircraft or the land vehicle.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method for harmonizing mounting provisions of a component in an aircraft or a land vehicle, comprising:

measuring orientation and positional parameters of two or more fixed points and distances between the two or more fixed points using a portable near infrared light emitting diode (IR LED) light source with a photogrammetric system, wherein the two or more fixed points are reference points with respect to the component of the aircraft or the land vehicle and residing within the aircraft or the land vehicle;

comparing the measured orientation and positional parameters of the two or more fixed points and the distances between the two or more fixed points on the aircraft or the land vehicle with specified design parameters of the component in the aircraft or the land vehicle; and harmonizing the component in the aircraft or the land vehicle based on an outcome of the comparison.

2. The method of claim 1, wherein measuring the orientation, and positional parameters of the two or more fixed points on the aircraft or the land vehicle comprises measuring roll, pitch and yaw of the two or more fixed points on the aircraft or the land vehicle.

3. The method of claim 1, wherein measuring the distances between the two or more fixed points on the aircraft or the land vehicle comprises measuring x, y and z direction distances between the two or more fixed points on the aircraft or the land vehicle.

4. The method of claim 1, wherein the portable near IR LED light source comprises a portable near IR LED pen, or a probe having two or more LEDs.

5. The method of claim 1, wherein measuring the orientation and positional parameters of the two or more fixed points and the distances between the two or ore fixed points using the portable near IR LED light source with the photogrammetric system comprises:

deriving a positional data of the two or more fixed points based on observing two or more LEDs located on the portable near IR LED light source by a camera residing in the photogrammetric system;

computing the orientation and positional parameters of the two or more LEDs relative to a camera global coordinate system by inputting the derived positional data received from the camera to a computing system residing in the photogrammetric system; and measuring the orientation and positional parameters of the two or more fixed points and the distances between the two or more fixed points by transforming the computed orientation and positional parameters.

6. The method of claim 1, wherein the orientation and positional parameters of the two or more fixed points and the distances between the two or more fixed points are measured with respect to one, two or three axis.

7. The method of claim 1, wherein measuring the orientation and positional parameters of the two or more fixed points and the distance between the two or more fixed points are based on continuous measurements or one-time measurements.

8. The method of claim 1, wherein harmonizing the component of the aircraft or the land vehicle comprises automatically obtaining mathematical geometrical results, manually performing any air or vehicle component mount adjustments, automatically selecting shimming sizes used for vehicle potted component mounts, and/or loading the measured orientation parameters and distance measurements into the aircraft or the land vehicle.

9. A system for harmonizing mounting provisions of as component in an aircraft or a land vehicle, comprising:

a photogrammetric system including a computing system and a camera., coupled to the computing system, wherein the computing system includes a database; and a portable near IR LED light source communicatively coupled to the computing system, wherein the portable near IR LED light source along with the photogrammetric system measures orientation and positional parameters of two or more fixed points and distances between the two or more fixed points, wherein the two or more fixed points are reference points with respect to the component of the aircraft or the land vehicle and residing within the aircraft or the land vehicle, wherein the photogrammetric system compares the measured orientation and positional parameters of the two or more fixed points and the distances of the two fixed points on the aircraft or the land vehicle with specified design parameters of the component, and wherein the photogrammetric system harmonizes the component based on an outcome of the comparison.

10. The system of claim 9, wherein the portable near IR LED light, source comprises a portable near IR LED pen or a probe having two or more LEDs.

11. The system of claim 10, wherein the portable near JR LED pen comprises a switch to trigger the portable near IR LED pen.

12. The system of claim 9, wherein the portable near IR LED light source along with the photogrammetric system are configured to measure roll, pitch and yaw of the two or more fixed points on the aircraft or the land vehicle.

13. The system of claim 9, wherein the portable near IR LED light source along with the photogrammetric system are configured to measure x, y and z direction distances between the two or more fixed points on the aircraft or the land vehicle.

14. The system of claim 9, wherein the portable near IR LED light source along with the photogrammetric system used to measure the orientation and positional parameters of two or more fixed points and distances between the two or more fixed points are configured to:

derive a positional data of the two or more fixed points based on observing two or more LEDs located on the portable near IR LED light source by the camera;

compute the orientation and positional parameters of the two or more LEDs relative to a camera global coordinate system by inputting the derived positional data received by the camera residing in the photogrammetric system; and measure the orientation and positional parameters of the two or more fixed points and the distances between the two or more fixed points by transforming the computed orientation and positional parameters.

* * * * *